United States Patent [19]
Garrison

[11] 3,826,269
[45] July 30, 1974

[54] VEHICLE WASHING APPARATUS
[76] Inventor: Harry F. Garrison, 7470 Gerald, Warren, Mich. 48192
[22] Filed: Aug. 11, 1972
[21] Appl. No.: 279,975

[52] U.S. Cl................. 134/123, 134/57 R, 134/199
[51] Int. Cl........................... B08b 3/02, B60s 3/04
[58] Field of Search............ 134/45, 57 R, 123, 181; 15/DIG. 2

[56] References Cited
UNITED STATES PATENTS

| | | | |
|---|---|---|---|
| 2,703,579 | 3/1955 | Merancy et al. | 134/123 X |
| 2,708,446 | 5/1955 | Phillips | 134/123 X |
| 3,368,572 | 2/1968 | Capra | 134/123 |
| 3,573,862 | 4/1971 | Brown | 134/123 |
| 3,612,077 | 10/1971 | Capra | 134/181 X |

FOREIGN PATENTS OR APPLICATIONS

| | | | |
|---|---|---|---|
| 1,522,785 | 3/1968 | France | 134/123 |
| 831,956 | 2/1952 | Germany | 134/123 |
| 841,966 | 7/1960 | Great Britain | 134/123 |
| 1,059,920 | 2/1967 | Great Britain | 134/45 |
| 119,081 | 10/1958 | U.S.S.R. | 134/123 |

*Primary Examiner*—Daniel Blum

[57] ABSTRACT

A limit switch closed by a vehicle activates an inverted U-shaped conduit with nozzles on the inner side thereof and pivotally mounted on its free ends to swing from the slightly below floor level forward of the vehicle to a slightly below floor-level position behind the vehicle. At the same time, a spray of wash water and detergent under pressure is ejected from the nozzles. The conduit then swings back to its forward position while emitting a water spray under pressure from its nozzles for washing off the detergent and water solution emitted during its rearward swing. Another limit switch shuts off the water flow as the vehicle then moves forward and passes between longitudinally spaced upright slotted ducts emitting a pressurized flow of drying air.

1 Claim, 2 Drawing Figures

PATENTED JUL 30 1974 3,826,269
FIG. 1
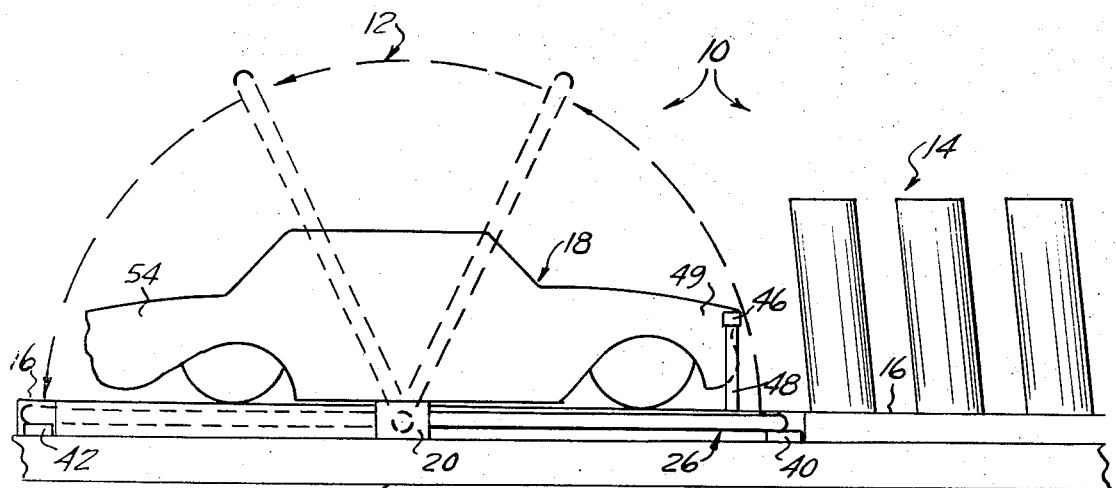
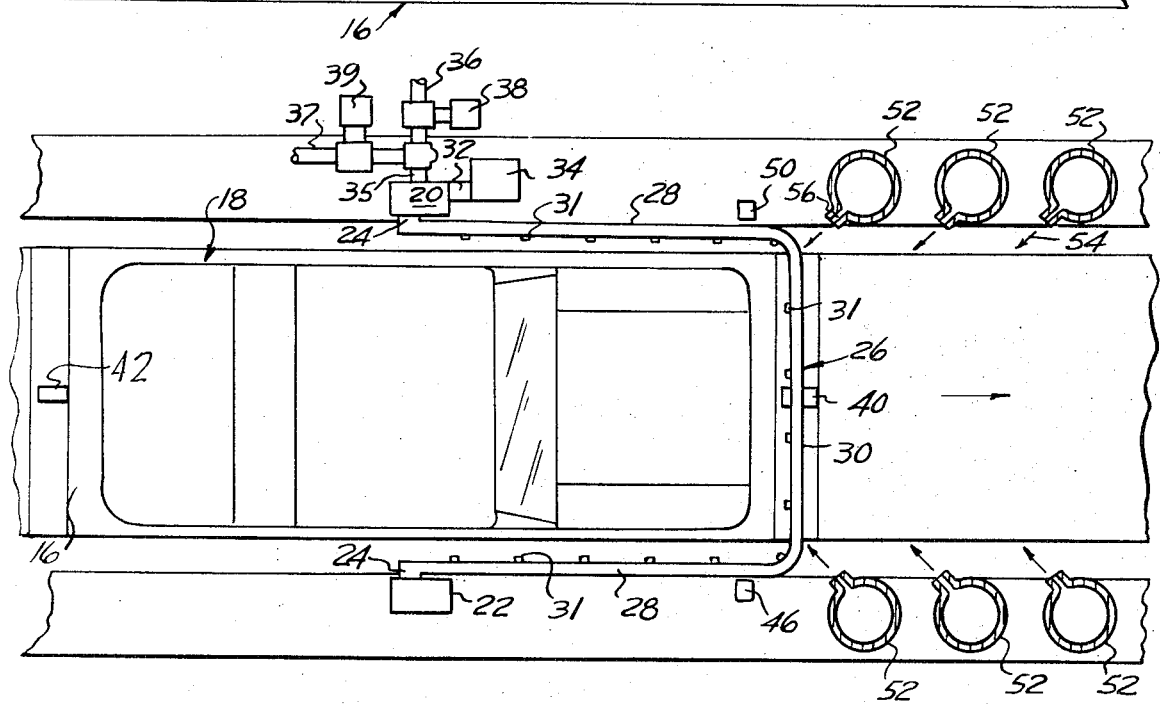
FIG. 2

VEHICLE WASHING APPARATUS

SUMMARY OF THE INVENTION

The invention particularly relates to the inverted U-shaped washing and rinsing conduit pivotally mounted at its lower ends to swing back and forth over the vehicle being washed, from foremost and rearmost positions below the plane of vehicle wheel travel, with a detergent and water solution emitted during forward swinging and with a rinsing water stream emitted during rearward swinging, the washing and rinsing liquid is turned on and shut off automatically by limit switches connected in circuit with electrically operated valves, such as solenoidally-operated valves.

In the drawing,

FIG. 1 is a side elevation of a vehicle washing and drying apparatus, according to one form of the invention, with the washing and rinsing conduit shown in solid lines in its starting position and in dotted lines in its successive operating positions; and FIG. 2 is a top plan view of the apparatus shown in FIG. 1.

Referring to the drawing in detail, FIG. 1 shows vehicle washing and drying apparatus, generally designated 10, subdivided into a washing-rinsing unit, generally designated 12, and a drying unit, generally designated 14, arranged in succession along an elongated vehicle runway or guideway 16 for a vehicle to be washed, generally designated 18. The drying unit 14 is conventional and beyond the scope of the present invention. The washing and rinsing unit 12 includes a pair of pivot blocks or supports 20 and 22 in which are pivotally mounted the coaxial lower end pivot portions 24 of an inverted U-shaped swinging washing conduit 26. The pivot block 20 and adjacent conduit portion 24 constitute a conventional liquid-conducting pivot joint, the construction of which is well known as, for example, in the similar liquid-conducting pivot joint employed in the ordinary lawn sprinkler with an oscillating arcuate spray conduit. The conduit 26 in addition to the coaxial lower end portions 24 has spaced parallel side portions 28 interconnected by a bridge portion 30. The inner side of the conduit 26 is provided with longitudinally spaced laterally projecting spray nozzles 31.

The pivot block 20 is hollow and contains a driving mechanism (not shown) by which the adjacent conduit pivot portion 24 is suitably connected through the neck 32, as by conventional gearing (not shown) to a motor-driven conventional speed-reducer 34. The hollow pivot support or block 20 is also provided with a water-detergent mixture inlet pipe 35 to which are connected water and detergent inlet pipes 36 and 37 provided with electrically operated water and detergent control valves 38 and 39 respectively, such as a conventional solenoidal valve.

A forward limit switch 40 and a rearward limit switch 42 are mounted at opposite ends of the runway or guideway 16 along which the vehicle 18 travels, for engagement by the bridge portion 30 of the swinging conduit 26 at opposite ends of its path of travel. A photoelectric light source 46 is mounted on a post 48 on the right-hand side of an entering vehicle 18 in a position for the light beam to be intercepted by the forward end part 49 of the vehicle 18. Aligned with the photoelectric light source 46 on the opposite side of the vehicle 18 is a second post 48 carrying at its upper end a photoelectric cell 50 positioned to receive rays from the light source 46 unless intercepted by the forward end part 49 of the vehicle 18.

Mounted forward of the swinging conduit 26 in spaced parallel relationship on opposite sides of the vehicle pathway 16 are upstanding drying ducts 52 connected to a motor-driven air blower (not shown) and adapted to emit thin approximately vertical air blasts in the direction of the arrows 54 from the elongated slit-like orifices 56. The latter are arranged at inclined positions so as to drive the water downwardly and rearwardly off the vehicle 18 as it passes between the two sets of drying ducts 52.

In the installation of the invention, let it be assumed that the forward and rearward limit switches 40 and 42 are connected in an electrical energization circuit of the motor-driven speed-reducer 34 with the photocell 50 likewise in this circuit.

In the operation of the invention, let it be assumed that the U-shaped wshing conduit 26 is in its forward lowered position shown in FIGS. 1 and 2 with its bridge portion 30 engaging the forward limit switch 40, and that a vehicle 18 is driven in the direction of the arrow (FIG. 2) from left to right so that it intercepts the light beam from the light source 46 to the photoelectric cell 50. The driver then halts the vehicle 18 in the intercepting position of the light beam, whereupon the circuits of the motor unit 34, the water valve 38 and detergent valve 39 are energized. As a result, the motor-driven speed-reducer 34 rotates the pivot portions 24 to swing the inverted U-shaped conduit 26 to the left in a counterclockwise direction while at the same time the water control valve 38 and the detergent control valve 39 are energized and opened, discharging water and detergent respectively from the water and detergent inlet pipes 36 and 37 into the mixture inlet pipe 35 and thence through the hollow pivot block 20 and through the adjacent conduit pivot portion 24 into the inverted U-shaped conduit 26 whence the mixture of water and detergent is discharged through the nozzles 31 onto the top and sides of the vehicle 18.

The inverted U-shaped conduit 26 continues to move rearwardly over the vehicle 18 while discharging its mixture of detergent and water through its nozzles 31 until it reaches its rearmost position accommodated in a recess in the runway (FIG. 1), where it engages the limit switch 42. As a result of this action, the limit switch 42 reverses the motor-driven speed-reducer 34 so as to reverse the direction of swing of the inverted U-shaped conduit 26, and at the same time closes the detergent control valve 39 while leaving the water control valve 38 in its open position. As a result, the inverted U-shaped conduit 26 swings forward in an arcuate path in a clockwise direction, spraying rinsing water under pressure through its nozzles 31 onto the top and sides of the vehicle 18 being washed.

The inverted U-shaped conduit 26 continues its forward clockwise swinging motion until it again reaches its forwardmost position in a recess below the vehicle pathway 16, whereupon it engages the forward limit switch 40. This action closes the water control valve 38 and also deenergizes and halts the motor-driven speed-reducer 34, so that the washing and rinsing operation ceases. The vehicle operator within the vehicle 18 then drives the vehicle 18 forward in the direction of the arrows in FIG. 2, whereupon it encounters the thin elongated streams of compressed air emitted through the correspondingly shaped air nozzles of the drying ducts 52, thereby pushing the water drops on the top and sides of the vehicle in a downward and rearward direction, drying the body of the vehicle 18. The latter continues its motion until it passes beyond the drying ducts 52 and emerges in a substantially dry condition from the exit end of the apparatus 10. Meanwhile, as the rearward end portion 54 of the vehicle 18 passes between the light source 46 and the photoelectric cell unit 50, the vehicle 18 ceases to interrupt the light beam therebetween, whereupon the photoelectric cell unit 50 deactivates the electric circuit until such time as another vehicle moves over the pathway 16 to again interrupt the light beam and thereby repeat the foregoing cycle of operation.

I claim:

1. A vehicle washing apparatus for installation upon a vehicle runway, comprising a pair of pivot supports mounted in laterally spaced coaxial relationship on opposite sides of said runway and having pivot axes therein disposed below said runway, an arcuately swinging inverted approximately U-shaped washing conduit disposed entirely underneath the plane of vehicle wheel travel at the forwardmost and rearmost positions of its path of swing and having multiple water outlets therealong on the inner side thereof and having at its lower ends pivot portions pivotally mounted in said pivot supports, recesses in the runway to accommodate the bight portion of the conduit in its forwardmost and rearmost positions, a washing liquid supply pipe connected to said conduit adjacent one of said pivot supports, means for connecting said washing liquid supply pipe to a source of water under pressure, and power-operated driving mechanism drivingly connected to one of said pivot portions for swinging said washing conduit in an approximately semi-circular path between said underneath rearmost and forwardmost positions thereof over a vehicle positioned on said runway.

* * * * *